ELECTRONIC SWITCHING TELEPHONE SYSTEM

Filed Oct. 31, 1963 5 Sheets-Sheet 1

INVENTORS
D.F. SEEMANN
N.V. MANSUETTO
C.R. GRINSTEAD
W.K.C. YUAN
E.G. PLATT

BY

ATTORNEY

ELECTRONIC SWITCHING TELEPHONE SYSTEM

Filed Oct. 31, 1963 5 Sheets-Sheet 5

3,324,248
Patented June 6, 1967

3,324,248

ELECTRONIC SWITCHING TELEPHONE SYSTEM

Donald Francis Seemann, Lockport, Eric Gordon Platt, Oak Lawn, William Ke-Chin Yuan, La Grange, Nicholas Victor Mansuetto, Lisle, and Charles P. Grinstead, Chicago, Ill., assignors to International Telephone and Telegraph Corporation

Filed Oct. 31, 1963, Ser. No. 320,363
23 Claims. (Cl. 179—18)

This invention relates to telephone systems and more particularly to electronic switching systems.

The invention makes use of end-marked, current controlled telephone switching networks. An example of one such network is found in U.S. Patent 3,204,044, entitled "Electronic Switching Telephone System," granted Aug. 31, 1965, to Virgle E. Porter, and assigned to the assignee of this invention. Briefly, in telephone systems using this type of network, requests for switch paths are made when equipment marks the two ends of a desired path with a firing potential. Responsive thereto, network crosspoints fire in a random manner until a self-seeking path finds its own, unguided way between the two end-marked points. Thereafter, the path holds itself until current is removed from the path. Then the path drops itself.

The end-markings are applied to the network by computer-like equipment. In the past, this equipment has either used common, scanner controlled registers or has been extremely simple so that controls are individualized to each call. The common scanner controlled systems are more expensive, and the individualized control systems are less versatile.

Thus, an object of the invention is to provide an intermediate system having both low cost and great versatility. Another object is to provide a telephone system using a pool of common equipment on a shared basis. In particular, an object is to provide extremely simple systems which call in specific common equipment only when and as it is required.

In accordance with one aspect of this invention, a telephone system comprises an end-marked, current controlled, self-seeking network having subscriber lines connected to one side and control equipment—including trunk circuits—connected to the other side. In general, the most numerous types of control equipments connected directly to the network are the simplest, most elemental circuits required to complete and hold a switch path. A common pool of more sophisticated equipment is accessible to this simple equipment for performing the more exacting controls. Thus, all of the many elemental circuits share the few sophistciated controls. This way, the most numerous circuits may be the least expensive and the most expensive circuits may be the least numerous. The obvious advantage is a low cost system giving a high performance service.

The above mentioned and other features of this invention and the manner of obtaining them will become more apparent, and the invention itself will be best understood by reference to the following description of an embodiment of the invention taken in conjunction with the accompanying drawings, in which.

Figure 1:
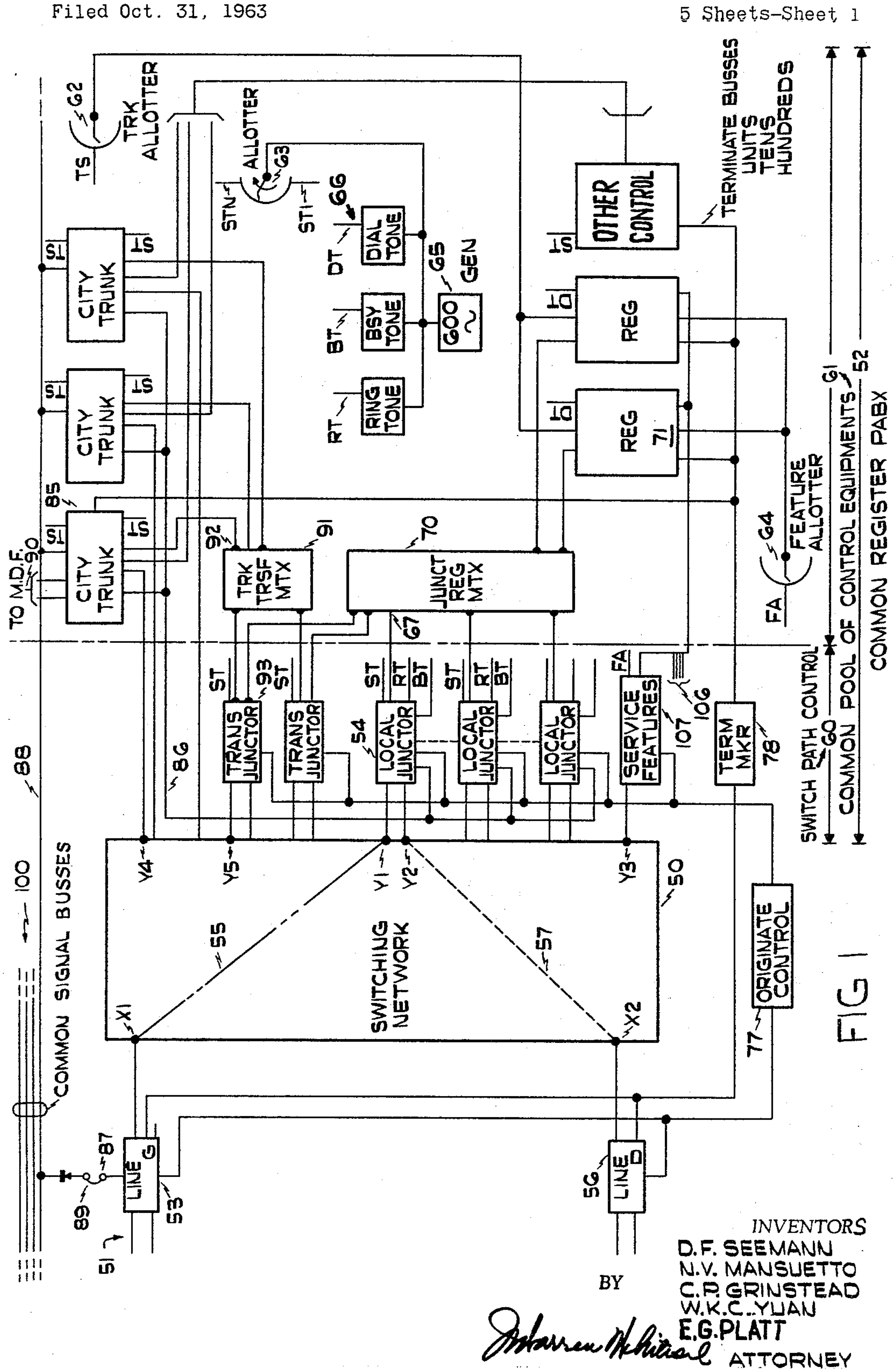
FIG. 1 is a block diagram showing the functional divisions of an exemplary telephone system which incorporates the invention.
Figures 5, 6, 7:
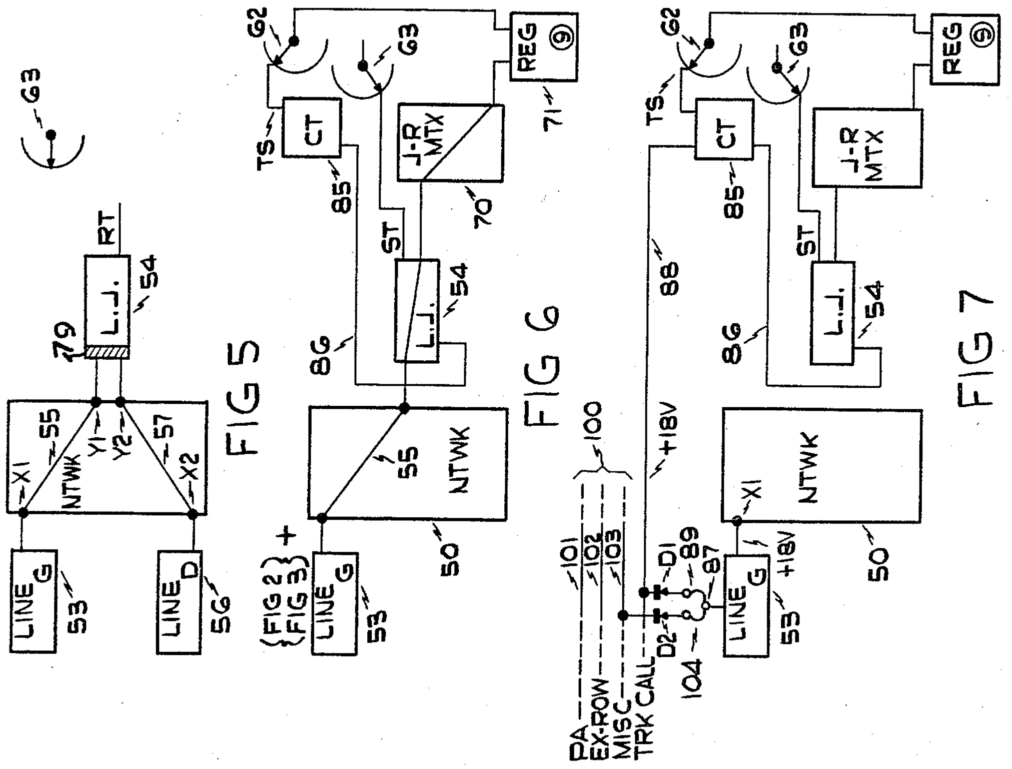
FIGS. 2–5 are sequence charts showing how the blocks of FIG. 1 interact to establish a local call.
FIGS. 6, 7 are sequence charts showing how special service features are given.
Figure 2:
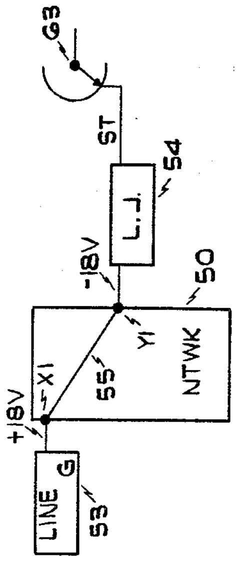
Figure 3:
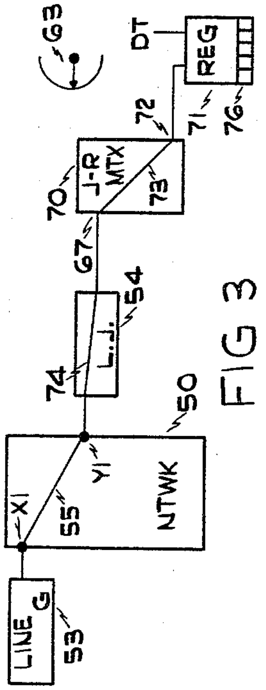
Figure 4:
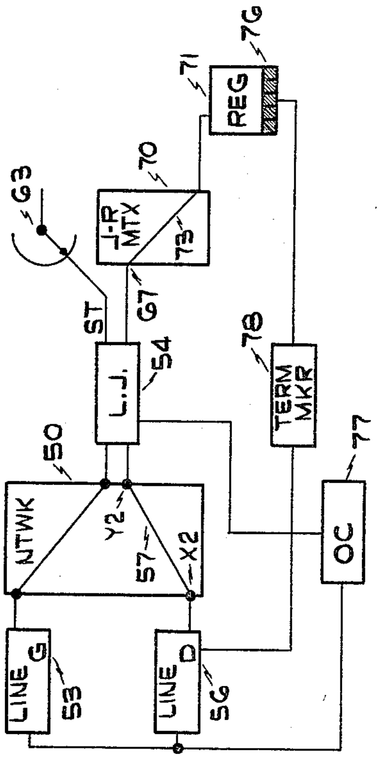

Each of the FIGURES 1–15 shows the same block diagram. FIG. 1 shows the entire diagram; each of the FIGS. 2–15 show only those of the blocks required to explain a given sequence of successive events occurring during a certain call or call function. The same reference numerals identifies the same parts in each figure. The notations $LINE_G$ and $LINE_D$ indicate calling and called lines, respectively.

Means are provided for completing and holding primary talking paths. More particularly, FIG. 1 shows a telephone system utilizing an end-marked current controlled network 50. The details of this network are shown in the above identified Porter application. Subscriber lines 51 are connected to one side of the network 50, and control equipments 52 are connected to the other side of the network. In general, the line circuits place a demand for service by applying an end-marking potential at an individually associated point "X" on the line side of the network. Equipments assigned to serve a call place another end-marking at an individually associated point Y on the control side of the network. Then a self-seeking primary talking path finds its own, unguided way from one end-marking over randomly selected crosspoints in the network 50 to the other end-marking, as over the dot-dashed line 55, for example. Thus, a calling line 53 may mark point X1 and seize an assigned control circuit 54 which marks point Y1. After the calling subscriber dials a wanted number, the called line 56 places an end-marking at point X2, and the control circuit 54 end-marks the point Y2. Then, another self-seeking path 57 finds its way from point X2 through the network 50 to point Y2. The control circuit 54 now interconnects the points Y1, Y2 to complete a talking path from the calling line 53 to the called line 56.

The construction and operation of the system described thus far is common to all end-marked networks of the described type. The invention is primarily concerned with the various control circuits shown at 52 on the right-hand side of the network 50. For background material relative to these circuits, reference may be made to the following co-pending applications, all assigned to the assignee of this invention:

| Title | Inventor | Serial No. | Filed | Patent No. |
|---|---|---|---|---|
| Electronic Switching Telephone System. | D. F. Seemann, E. R. Haskins. | 113,178 | 5–29–61 | 3,204,038 |
| Ring Counter and Marker. | W. K. C. Yuan | 183,859 | 3–30–62 | 3,209,204 |
| Constant Voltage Device. | A. M. Hestad | 174,351 | 2–13–62 | 3,223,781 |
| Class of Service | E. G. Platt, W. K. C. Yuan. | 204,807 | 6–25–62 | 3,133,157 |
| Electronic Switching System. | N. V. Mansuetto, E. G. Platt, D. F. Seemann, W. K. C. Yuan. | 216,636 | 8–13–62 | 3,258,539 |
| Electronic Private Branch Exchange. | D. F. Seemann, J. J. Dupuis, G. K. Chen. | 230,588 | 10–15–62 | 3,221,108 |
| Group Hunting | D. F. Seemann, E. G. Platt, W. K. C. Yuan, N. V. Mansuetto. | 231,892 | 10–22–62 | 3,221,107 |
| Multiple Access Circuit. | E. G. Platt, J. J. Dupuis. | 275,693 | 4–25–63 | 3,291,915 |

Many of the techniques used herein are described in one or more of the above applications.

In general, the control equipment 52 may be divided into two parts, indicated in FIG. 1 by a vertical dot-dashed line. The most numerous switch path control equipments 60, which connect directly to the right-hand side of network 50, are the simplest, most elemental circuits required to complete and hold switch paths through the network. The remaining equipments 61 constitute a common pool of more sophisticated controls.

Means are provided for giving the switch path control equipment 60 access to both the network 50 and the pool of common equipment 61 on a time shared basis. More specifically, each of the allotters 62–64 is a device for cyclically enabling various circuits to take control of the network 50 or the equipments 61 in an established sequence. For example, each of these allotters may be a simple ring counter having a number of output terminals, one terminal for every counter stage. The first of such terminals, ST1 ("ST" means "start"), may connect to an "ST" terminal on local junctor 54, for example. The last or "Nth" terminal, STN, connects to the ST terminal on the last circuit designated as having an "ST" terminal. All other circuits having such an "ST" terminal are connected to an intermediate terminal on allotter 63. Thus, a circuit energized via lead ST1 is enabled to operate during a first time frame. Circuits energized via leads ST2, ST3, . . . etc. (not shown) are sequentially enabled during second, third . . . etc. time frames. The "Nth" circuit is energized via lead STN during the "Nth" time frame. In a similar manner, every circuit having a TS (trunk start) lead connects to a corresponding terminal on the trunk allotter 62. Also every circuit having an FA (feature allot) lead connects to a corresponding terminal on the features allotter 64. Thus trunks and features are enabled by allotters 62–64 on their own time bases.

All of these allotters may be driven from a common pulse source to provide coordinated time base operations. However, this is primarily an economy and is not essential to the invention. By way of example, the allotter 63 is here shown as driven by a 600 pulse per second generator 65. In addition, this same generator may drive allotters 62, 64. Also, its output may be used to provide dial tone (DT). Or, its output may be interrupted at one rate to provide busy tone (BT) and another rate to provide ring tone (RT). All dial tone (DT), busy tone (BT), and ring tone (RT) leads shown elsewhere in the drawing are connected to their respective source leads 66.

The remaining blocks in FIG. 1 represent equipment for providing services and operations well known to those skilled in the art. Therefore, it is thought that the nature of this equipment will become apparent from a description of how various calls are extended through the system. As this description proceeds, the reader may follow the operation by inspection of either FIG. 1 or FIGS. 2–15. However, the specification will refer only to FIGS. 2–15.

*Local call.*—At any given time the allotter 63 marks a particular start lead ST to assign a particular junctor 54 as the circuit which will serve the next call. The assigned local junctor 54 responds by applying a (—) 18 v. end-marking to point Y1.

Assume that a calling subscriber at station 53 removes a receiver or hand set to place a call (FIG. 2) at the described instant when junctor 54 marks point Y1. This causes a (+) 18 v. end-marking to appear at point X1 as a request for service. The potential difference (36 v.) between the end-markings appearing at points X1, Y1 causes a self-seeking path 55 to find its way through the network 50. No other junctor is allotted at this instant—no other Y end-marking can be applied to the network 50. The path can extend to no place except point Y1. If several X markings are present, several paths race for the same Y1 marking. However, it is virtually certain that one path will win the race and reach point Y1 first. The first completed path eliminates the 36 v. potential between the X and Y end-markings. Therefore, current cannot flow over the uncompleted paths, and diodes in those paths must starve and wait for a chance to race to the next Y marking which will appear when the allotter 63 allots the next idle junctor. The system is designed to provide enough junctors so that no line has to wait longer than an established maximum period of time, which the subscriber cannot readily detect, before obtaining a path to a free junctor.

Means are provided for completing a secondary control path through a separate switching matrix to return dial tone (FIG. 3) to the calling line 53. More particularly, the junctor 54 recognizes the completion of path 55 through network 50 by the disappearance of the (—) 18 v. end-marking which it applied when it was idle and allotted. Then, junctor 54 responds to this disappearance of the (—) 18 v. marking by applying an end-marking to point 67 of a junctor-register matrix 70. This matrix is completely separate from the main switching sections 50. If any register 71 is idle, it applies an end-marking at point 72. If no register is idle, junctor 54 simply waits with its marking applied to point 67. Again, the system is designed with an adequate number of registers so that the junctor 54 does not have to wait too long. In any event, a secondary control path 73 is completed through the matrix 70 responsive to the end-markings 67, 72. Then, register 71 returns dial tone over paths 73, and 55 to calling line 53.

The allotter 63 goes its way and allots other equipments to serve other calls. Meanwhile, the calling subscriber dials the number of the called line. The register recognizes completion of dialing because its storage tanks 76 are then filled.

The call is terminated (FIG. 4) to the called line 56. That is, after tanks 76 are filled, the register 71 signals the junctor 54. When the allotter 63 next assigns junctor 54, it end-marks point Y2, signals the register 71, and marks an originate control circuit 77 to inhibit all originating calls (i.e. no calling line can end-mark a point X on the line side of the network 50). The register 71 marks the called line 56 (and only the called line) via a terminate marker 78. Line 56 marks point X2 and path 57 finds its way from this point X2 through network 50 to end-marked point Y2.

Ringing tone (RT) is sent from the local junctor 54 (FIG. 5) over path 57 to called line 56. Meanwhile, junctor 54 drops the connection 73 (FIG. 4) by removing the current through point 67. Register 71 is now freed to serve some other call, and allotter 63 enables another circuit.

After the call is answered at line 56, local junctor 54 closes a voice gate 79 to complete and hold a voice connection between points Y1, Y2. The subscribers now talk to each other via paths 55, 57 and voice gate 79. The call is released when either subscriber hangs-up to remove current through the points X1 or X2.

*Trunk call.*—An important aspect of the invention resides in the manner of providing special features. Functionally, this is accomplished when one among a plurality of common signal busses are selectively marked during a time frame which identifies a particular circuit involved in a particular call. Because of the time frame, all system equipments are momentarily individualized to that particular circuit, and therefore, to that particular call. In this manner the services given to the particular call are made extremely flexible, because it can seize any desired features circuit.

In the next call to be described, the feature is a trunk call. The features circuit to be seized is the city trunk circuit 85. The circuit to do the seizing is the local junctor 54, and the signal bus 88, which is common to all lines and control circuits.

In greater detail, this trunk call begins with the functions described above in connection with FIGS. 2 and 3. The register 71 (FIG. 6) recognizes the trunk call as such because the first digit that it receives is the number "9." Responsive thereto, register 71 places a demand on trunk allotter 62. If the city trunk circuit 85 is then free, it may be allotted during its time frame via a conductor TS. If it is not free, some other city trunk circuit is energized during its time frame when a trunk allotted lead TS is marked. Simultaneously, the register 71 causes the associated local junctor 54 to mark conductor 86, thereby individualizing the junctor requesting a trunk call feature with the alotted trunk circuit 85. To avoid the possibility of a double trunk seizure, the trunk seizure function can occur only during the time frame when the allotter 63 enables the junctor 54.

Means are provided for selectively marking certain ones of many common busses according to the services given to particular lines; for example, if the line 53 is given access to a city trunk, it may mark point 87 (FIG. 7) and signal bus 88, but only if jumper 89 is present. More particularly, to seize a trunk line, the junctor 54 drops its connection 55 through the network 50 whereupon the potential at point X1 climbs back toward the (+) 18 v. and marking potential. Whenever the line side end-marking returns to or near this (+) 18 v., after a path has once fired through network 50 during a call, a marking appears at point 87 and therefore on signal bus 88. The bus 88 is unique to a particular feature, which here is the feature service given by the city trunk circuits, such as 85. If the line 53 is given restricted service (i.e. not allowed to make a trunk call), the jumper 89 is omitted and the marking cannot reach the signal bus 88.

An "and" function occurs in trunk circuit 85 if it reaches simultaneous markings on conductors TS, 86 and 88. Responsive thereto, trunk circuit 85 applies a (−) 18 v. end-marking (FIG. 8) to point Y4. Point X1 has climbed back toward (+) 18 v. because the path 55 was dropped. Thus, path 89 fires through the network 50.

Figures 8, 9, 10, 11, 12:
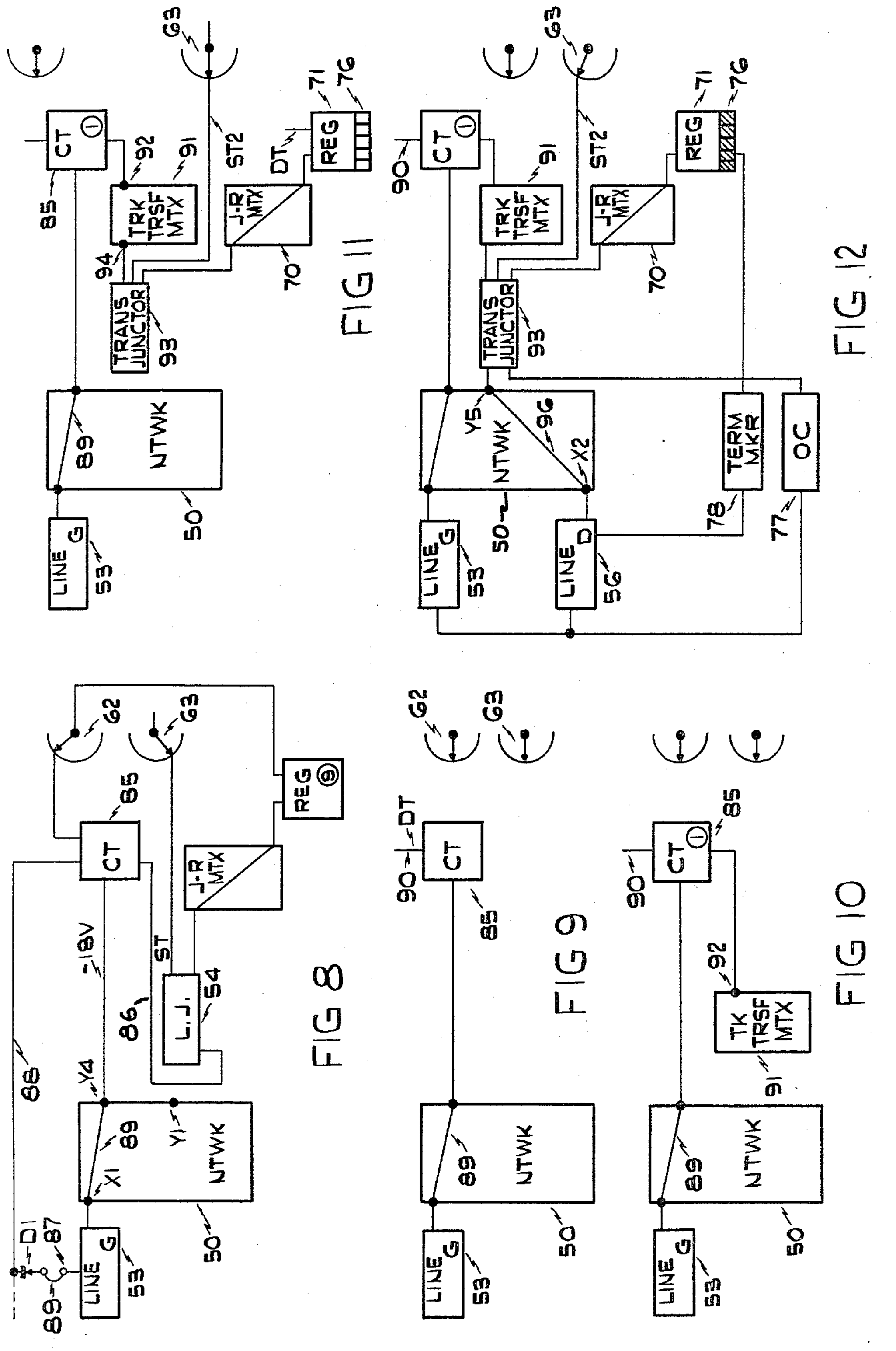
FIGS. 8–11 are sequence charts showing how a trunk call is established.
FIGS. 12–15 are sequence charts showing how a trunk call is transferred from one line to another or how a conference call is established.

All of the described trunk call functions have occurred during a single ST time frame while allotter 63 marks the start lead ST which is individual to the local junctor 54. Now the allotters 62, 63 move on to assign and enable other equipment (FIG. 9). All equipment except the trunk circuit is released, and equipment (not shown) in a distant office returns dial tone over trunk line 90. The call now proceeds in a normal manner. If the trunk call is not completed to trunk line 90 before near the end of the ST time frame which designates local junctor 54, the junctor drops trunk circuit 85 by de-energizing bus 86. Then, junctor 54 applies a new end marking to point Y1, refires path 55, and returns busy tone to the calling subscriber. Thus, if line 53 is not connected to signal bus 88 via jumper 89, there is no "and" function at trunk circuit 85. The trunk call is not completed, and busy tone is returned to line 53. Diodes D1 and D2 are for isolating the various circuits connected to signal bus 88 from each other.

*Call transfer.*—Means are provided completing another secondary control path through another separate switching matrix to seize a control circuit in the common pool 61 for completing a call transfer function. To explain this feature, we assume that the calling subscriber 53 learns, during a conversation, that he must transfer his connection with the trunk line 90 to another subscriber line 56 (FIG. 10). To do this, he dials "1" (indicated in FIG. 10 by an encircled "1") which the trunk circuit 85 recognizes as a request for transfer. Responsive thereto, a separate trunk transfer matrix 91 is marked at point 92. A marking potential also appears at point 94 when transfer junctor 93 is next allotted (FIG. 11) by a pulse on conductor ST2. The potential difference between the points 92, 94 is now sufficient to fire a secondary control path through the trunk transfer matrix 91. Then transfer junctor 93 also marks matrix 70 to seize an idle register 71.

Dial tone is returned to line 53 from register 71, through matrix 70, transfer junctor 93, matrix 91, trunk circuit 85, and path 89. The subscriber on line 53 dials the directory number of line 56 which is stored in tanks 76 of register 71 (FIG. 12).

When the allotter 63 next marks the lead ST2 to enable transfer junctor 93, it applies an end-marking to point Y5, and register 71 causes the called line 56 to mark the point X2. Responsive thereto, path 96 finds its way through the network 50.

Figure 13:
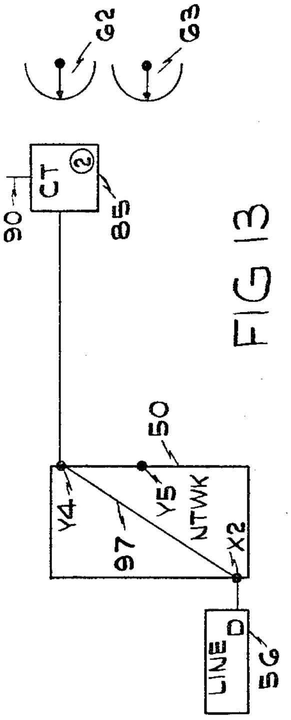
Figure 14:
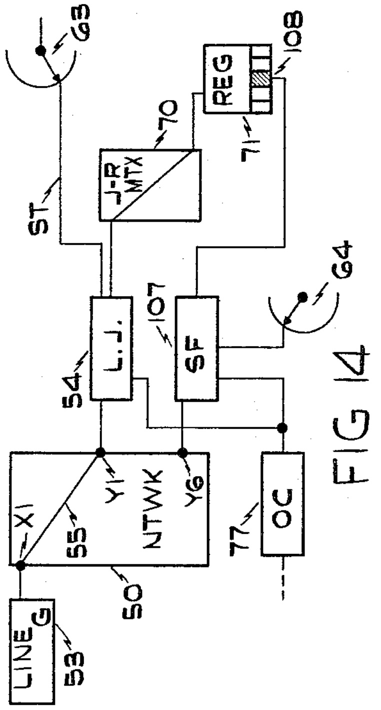
Figure 15:
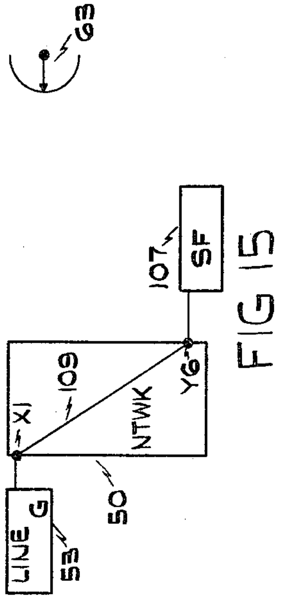

After the subscriber on calling line 53 completes his part of the call, he dials the digit "2," as indicated by the encircled "2" in FIG. 13. The trunk circuit 85 recognizes this digit as a disconnect signal and momentarily removes a holding potential from point Y4. When the point Y4 is re-energized, point Y5 is de-energized. This drops path 96 and causes path 97 (FIG. 13) to find its way through the network 50. Upon completion of this path 97, the trunk circuit 85 drops the connection to trunk transfer matrix 91 and all associated equipment. Thereafter, line 56 is connected through trunk circuit 85 to trunk line 90. Since all of these functions occur at electronic speeds, the conversing subscribers do not realize when the paths over which they are talking through the network 50 are connected or disconnected.

*Special features.*—Returning to FIG. 7 for a moment, the reader will notice that not just signal bus 88, but many common class of service busses 100, are provided. For example, bus 101 here indicates a need for public address equipment, bus 102 indicates executive right-of-way, and bus 103 indicates any other miscellaneous service. There could, of course, be many other busses in addition to those shown. Line 53 is here shown as jumpered at 104 to the miscellaneous service bus 103, but not to either the public address or executive right-of-way busses 101, 102. Thus, line 53 is given access to equipment for providing the miscellaneous service, but not to the other two kinds of equipment. It may also be well to recall that the point 87 inherently goes to (+) 18 v. whenever the associated path through the network 50 is dropped. Thus, if such path is dropped at a time when a demand for miscellaneous service appears elsewhere in the system, the marking on bus 103 will enable line 53 to gain such service. This demand for miscellaneous service is applied in the manner that the demand for a city trunk was applied by a marking on bus 86. On the other hand, if the demand is for public address equipment or executive right-of-way equipment, the absence of jumpers from point 87 to bus 101, 102 will deny line 53 access to such equipment, or vice versa.

The bracket 106 (FIG. 1) indicates that any number of features could be provided. For example, these features could be executive right-of-way, code call, paging, camp-on busy, or the like. The numeral 107 indicates a specific feature which could be any of features generally indicated at 106. Also, the features service may be requested at any time during a call. It could be requested at the start of a call; or it could be while a call is in progress. In any event, the circuits are placed in the condition of FIG. 14 by any suitable process. Then the subscriber 53 dials a distinctive digit or digits which identifies the service required. Symbolically, this digit is represented by the hatched storage tank 108. As soon as the register 71 recognizes the digit stored in tank 108, the local junctor 54 is signalled. When the allotter 63 next allots junctor 54, the register 71 requests a service feature circuit. At that time the feature allotter 64 is allotting an idle feature circuit 107 of the requested type. Circuit 107 applies an end-marking Y6 to the network 50 while allowing originate control circuit 77 to originate calls. Then, junctor 54 removes current from point Y1 to drop path 55. When path 55 drops, the potential at point Y1 climbs back toward the (+) 18 v. marking of FIG. 7. Soon the potential difference between points X1, Y6 reaches a firing potential, and path 109 (FIG. 15) finds its way from line 53 to service feature circuit 107. All other equipment drops out and the special service feature circuit 107 serves the needs of the calling subscriber who uses line 53.

*Line identification.*—Means are provided for identifying the directory number of the calling line 53 (FIG. 16) responsive to a dropping of the path 55 through the network. In general, this means comprises a signal bus 111 ((in group 100) and a group of busses 112 which are common to the system. The busses 112 include ten tens busses (one of which is shown at 113) and ten units busses (one of which is shown at 114). Each line circuit uniquely connects (according to its directory number) to these busses via a diode network 115. For example, if line 53 has the director number "53," bus 113 is the fifth tens bus and bus 114 is the third units bus. If line 53 had any other directory number corresponding connections would be made. Also, if the directory number of line 53 has hundreds and thousands digits it will connect to hundreds and thousands busses (not shown) in like manner. The special features circuit used this time comprises an identification circuit 116 (one of those indicated generally at 106) and a toll ticketing system 117. For present purposes, these components may take any convenient, well known form.

Figure 16:
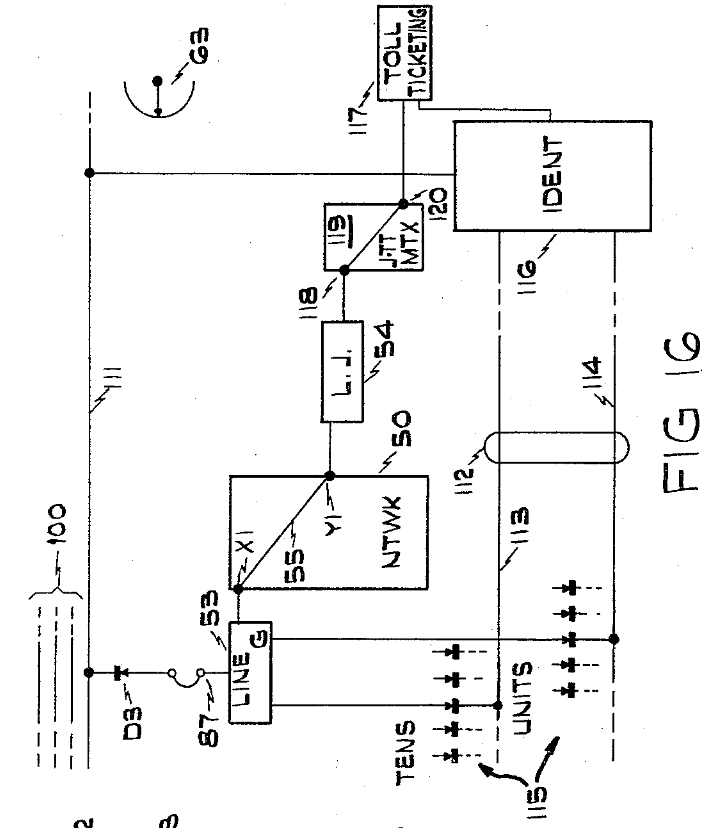
FIG. 16 is a logic circuit diagram showing how the blocks of FIG. 1 perform certain functions.

In greater detail, FIG. 16 shows a toll ticketing system adapted to function in conjunction with the electronic switching network 50. As before, a connection 55 is extended from the line 53 through the network 50 to the local junctor 54. Then, in any suitable manner, (detection of an area code, for example), the local junctor 54 discovers the need for toll ticketing equipment and proceeds to apply a marking to an access point 118 of a junctor-toll ticketing matrix 119. Idle ticketing equipment, if any, is then applying a similar marking to point 120 on the other side of the matrix 119. Thus, a path finds its way through the matrix 119 to the toll ticketing equipment 117. But the toll ticketing equipment does not yet know the calling line directory number which is to be charged for the call. Therefore, the toll ticketing cannot now print a ticket.

To identify the calling line 53, the toll ticketing equipment 117 first signals the local junctor 54. Then the junctor 54 momentarily removes and almost immediately re-establishes the potential at its end-marked point Y1. This causes the path 55 to drop and then re-establish itself. The result is that a (+) 18 v. pulse appears at points X1 and 87. This means that a (+) 18 v. potential appears simultaneously on busses 111, 113, 114. These markings complete an "and" function in identifier 116 which responds by reading out the calling number "53" to ticketer 116.

*Junctor.*—Before proceeding further, it may be well to note a characteristic which is being used widely in the system to provide a control over many general functions. This is the drop path feature already described in connection with trunk calls (FIG. 7), special service features (FIG. 15), and line identification. These and other features are controlled primarily by the various junctor circuits. Since the various junctors are similar, it is thought that all may be understood by a description of an exemplary one of them. For this description, reference is made to FIG. 17 which shows the logic of the transfer junctor 93. Those skilled in the art will readily perceive how to use the techniques embodied in this junctor in other circuits.

Figure 17:
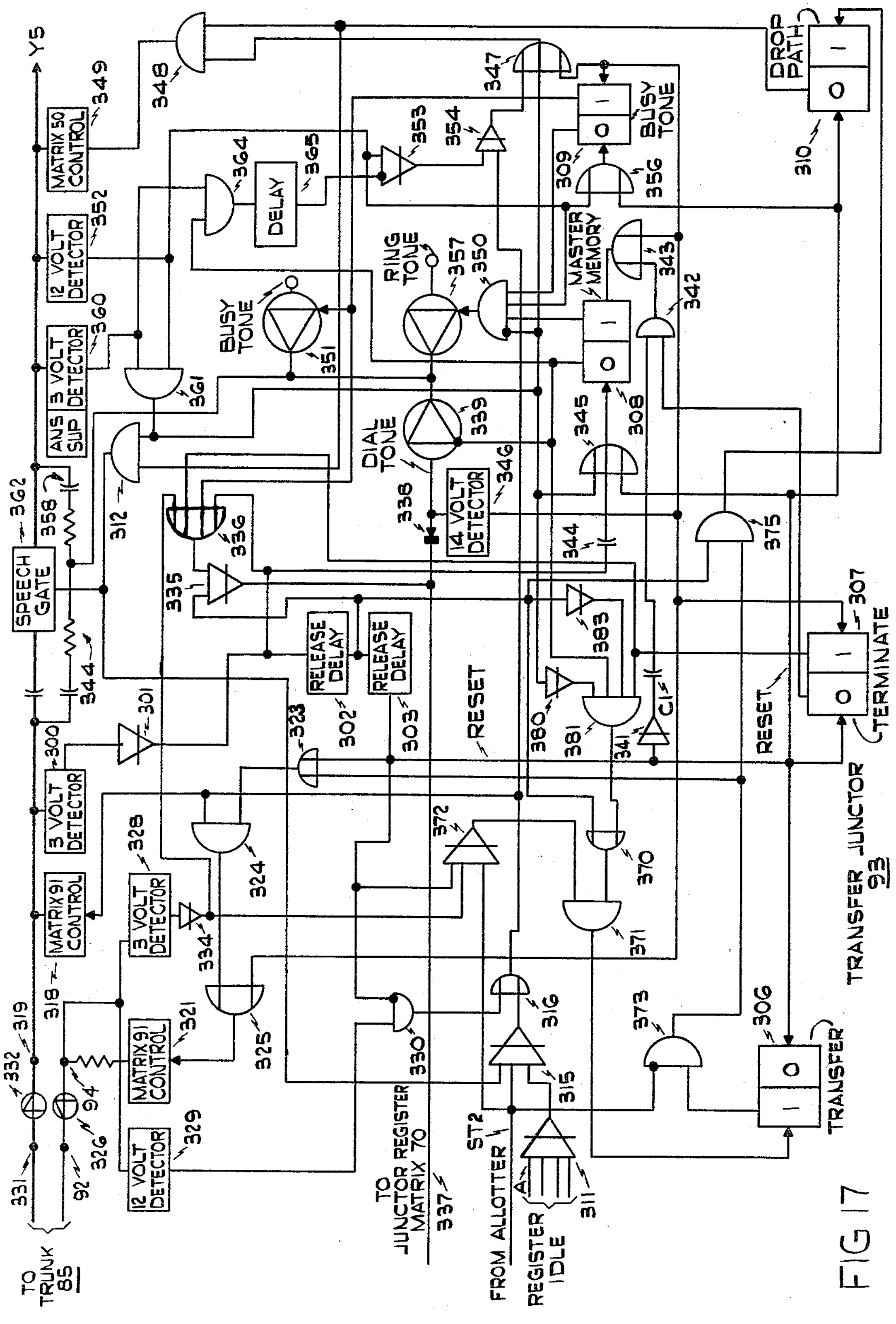
FIG. 17 is a logic diagram which shows the circuitry of a junctor circuit.

Since the components shown in FIG. 17 are standard logical symbols, it is thought that the junctor will be best understood by a description of how a call may be extended through the circuit. The drawing is arranged to follow the convention wherein a call progresses in the direction extending from left-to-right. The speech path is shown in FIG. 17 by means of a heavily inked line, the two ends of which are designated by the reference characters 319, Y5.

Before a call occurs, the 3-volt detector 300 provides no output and the inverter 301 is "on." The output of inverter 301 feeds through two release delay circuits 302, 303 to a RESET conductor. This causes the flip-flop circuits 306–310 to reset to their "0" sides.

If any register is idle and available, it prevents an output from being sent from gate 311. For example, if idle, the register 71 could mark terminal A to inhibit the gate 311. If the transfer junctor 93 is idle, the gate 312 is also "off"; thus, both upper and lower terminals of NOR gate 315 are de-energized. When the junctor time slot occurs, a marking disappears from conductor ST2, and there is a coincidence of "off" conditions which causes the NOR gate 315 to conduct.

Responsive to the output of the NOR gate 315, current flows through an OR gate 316 to cause a matrix control circuit 318 to mark an access point 319 on the trunk transfer matrix 91 (FIG. 11). Also, current flows through the gates 316, 324, 325, and circuit 321 to mark the point 94. Parenthetically, the AND gate 324 is now conducting because the circuit 303 applies a voltage through the OR gate 323 to the lower input of the AND gate 324.

The trunk circuit 85 is marking the point 92 as a request for transfer, thus the PNPN diode 326 fires. Thereupon, the point 94 changes voltage, and the 3-volt detector 328 turns "on." Also, the 12-volt detector 329 turns "on." The output of detector 329 appears at the input of the gate 330 which is now inhibited by the output of the circuit 303.

Also responsive to the firing of the diode 326, a detector in city trunk trunk circuit 85 (not shown) but connected to point 92 detects a change of potential. This causes an end-marking potential to appear at the point 331 and fire the PNPN diode 332. When it fires, the potential at the point 319 changes and causes the 3-volt detector 300 to switch "on." The inverter 301 turns "off." The timing is such that the delay circuits 302, 303 turn "off" quickly and in sequence. This removes an input from OR gate 323 for terminating the firing pulse. Also, when circuit 303 turns "off", the gate 330 allows passage of the signal from the detector 329 to hold the control circuit 318 "on," and therefore, to hold the path including diode 332 through the matrix 91. The path including the diode 326 is held from the trunk circuit.

All the above described operations occur during the period of the time slot ST2.

When the detectors 328, 300 turn "on," the inverters 334, 301 turn "off." Also, the release delay circuit 302 turns "off." Since the OR gate 336 does not conduct at this time, the NOR gate 335 turns "on." The output of the NOR gate 335 is applied over a two-way signaling lead 337 to seize a register via matrix 70 (FIG. 11)—which could be the register 71, for example.

Dial tone is returned from the register 71 over conductor 337 and through the diode 338 to the dial tone gate 339 from which the tone is sent to the calling subscriber. In greater detail, during the idle state, the output of circuit 303 fed over a RESET conductor to set a master memory flip-flop 308 to its "0" side (via gate 345). The output from this side of flip-flop 308 inhibited the dial tone gate 339. After the release delay circuit 303 turns "off" because diode 332 fired, an inverter 341 turns "on" to pulse an AND gate 342 for the time required to charge a capacitor C1. A terminate flip-flop 307 is on its "0" side, thus the AND gate 342 conducts to pulse OR gate 343. The flip-flop 308 switches to its "1" side. This removes an inhibit from the gate 339, and dial tone is sent from conductor 337 through network 344 to the calling line.

The calling subscriber transmitted dial pulses turn the detector 300 "off" and "on," and therefore, the inverter 301 turns "on" then "off." This also pulses the release delay circuit 302, but it holds off due to its slow-to-release characteristics. Each dial pulse is fed from inverter 301 through the lower most input of OR gate 336 to turn the NOR circuit 335 "off" then "on," thus repeating the pulse to the register over the conductor 337. Also the output of the inverter 301 feeds through the capacitor 344 and OR gate 345 to switch the master memory flip-flop 308 to its "0" side. This inhibits the dial tone gate 339, and removes dial tone from the line.

The register recognizes a full complement of digit pulses and responds by applying a 14-volt pulse to the conductor 337. This 14-volt pulse causes a 14-volt detector 346 to turn "on" and pulse each of the flip-flops 307, 308, 309 to their "1" side. A signal is also transmitted from the 14-volt detector 346 through the OR gate 325 and circuit 321 to notify the city trunk circuit that a switch through is imminent. Finally, the 14-volt detector 346 sends a pulse through an OR gate 347, AND gate 348 (which conducts) to a matrix control circuit 349. This causes an end-marking to appear at point Y5 as an indication that a switch path should be extended through the network 50.

The output from the "1" side of the terminate flip-flop 307, feeds through the OR gate 336 to turn "off" the NOR gate 335. This removes a potential from the conductor 337 and releases the register.

The output from the "1" side of the master memory flip-flop 308 energizes an input of an inhibitable AND gate in 350 preparatory to the transmission of a ring signal. The output from the "1" side of the busy tone flip-flop 309 feeds to the enable terminal of busy tone gate 351. There may be an extremely short spurt of busy tone; however, since paths fire through the network 50 at electronic speeds, the calling subscriber is not aware of this spurt of busy tone if a path successfully fires to the called line. If the requested path is not so completed, of course the busy tone does last long enough to be consciously heard, and the calling subscriber hangs-up.

Assuming that the path 96 (FIG. 12) fires from point Y5 through the network 50 to the called line, the potential at point Y5 changes. A 12-volt detector 352 responds and provides an output potential which turns "off" an inhibitable inverter 353 and resets the busy tone flip-flop 309 for terminating the short spurt of busy tone. The inverter 353 is now "off"; thus, NOR gate 354 conducts to provide holding current for the path 96 via circuits 347, 348, 349.

Ring tone is sent to the called subscriber line. More particularly, when the output from the 12-volt detector 352 feeds through OR gate 356 to reset the busy tone flip-flop 309, there is a coincidence at the input of AND gate 350 which conducts to enable the ring tone gate 357. Ring tone is now sent through tone gate 357 to the called line via a network 358. To provide ring back tone, a similar signal is returned to the calling line via the network 344.

Answer supervision—which occurs when the called subscriber answers—is indicated by an output from the 3-volt detector 360. This output coincides with the output from the 12-volt path completed detector 352; thus, AND gate 361 conducts. This causes an coincidence gate 312 to conduct and close a speech gate 362 to complete the voice path over the heavily inked line. Also, the output of AND gate 361 inhibits gate 350 to trip ringing and reset the master memory flip-flop 308 (via OR gate 345) to its "0" side. The output of AND gate 361 feeds through OR gate 347 and AND gate 348 to cause the matrix control circuit 349 to hold the speech path 96 which extends through the network 50 to the called line.

The parties may now converse with each other.

*Master memory.*—An important feature of the invention resides in the reuse of the master memory flip-flop or bistable circuit 308. This circuit is switched back and forth between its two stable states in conjunction with the other special function flip-flop circuits 306, 307, 309, 310 to provide sequence of events control.

This master memory feature will be understood best by a recapitulation of portions of the preceding description. That is, in the idle state, this flip-flop circuit 308 normally rests on its "0" side. When the path first fires from the city trunk circuit 85 through the trunk transfer matrix 91 to the junctor circuit, the inverter 301 switches "off" and removes the output potential of the two release delay circuits 302, 303. As the circuit 303 switches "off," a pulse is fed through the capacitor C1 to switch the master memory flip-flop 308 to its "1" side. The removal of an output potential from the "0" side enables the passage of dial tone. When the first dial pulse is received, the inverter 301 switches "on," and the flip-flop 308 returns to its "0" side to inhibit the dial tone gate. Responsive to the termination of the last dial pulse, the register places a voltage on the conductor 337 and causes the 14-volt detector circuit 346 to switch the flip-flop 308 back to its "1" side. This causes the transmission of the ring signal. The called subscriber responds to the ring signal, and the answer supervision detector 360 causes the flip-flop 308 to return to its "0" side and trip ringing. Also, this last operation of the flip-flop 308 stores a memory that the called subscriber has answered.

To understand the importance of this stored memory that the called subscriber has answered, it may be well to note how the various talking path holding circuits for the called line connection 96 (FIG. 12) are switched about in junctor 93. First, a firing pulse and the initial talking path holding current are supplied when the register causes the 14-volt detector 346 to feed a signal through the gates 347, 348 to the control circuit 349. When the path 96 (FIG. 12) is initially completed, a potential appears at the output of the detector 352 and, thus, at the input of the inhibitable inverter 353. The inverter 353 turns "off," and the inverter 354 turns "on." This supplies the talking path holding current to circuit 349 via the gates 347, 348. When answer supervision occurs, the detector 360 energizes an input of AND gate 364. Then, because flip-flop 308 stands on its "0" side, gate 364 conducts and a delay circuit 365 turns "on." This causes a signal to inhibit and hold "off" the inverter 353 to maintain the "on" condition of inverter 354, which supplies the talking path holding current.

If a false pulse should occur and make it appear that the called subscriber has hung-up there will be no immediate effect because the flip-flop 308 is standing on its "0" side where it energizes one input of the AND gate 364 which conducts to inhibit inverter 353. The false, on-hook simulating pulse causes a momentary disappearance of the output from the detector 360. If the flip-flop 308 were not standing on its "0" side, the inverter 353 would immediately switch "on," the NOR gate 354 would immediately switch "off," and the talking path holding potential would disappear from the network access point Y5. However, with the flip-flop 308 standing on its "0" side, a control signal is extended through the AND gate 364. The delay circuit 365 conducts for a period of time and inhibits this inverter action for a discrete period of time which is long enough to mask the momentary effects of a false on-hook simulating pulse. The result is that the inverter 354 continues to conduct and hold the path 96.

On the other hand, if the delay circuit 365 times out before a potential returns to point Y5, it almost certainly means that a true on-hook signal has been received. Thus, upon timing out, the delay circuit 365 removes the inhibit from the inverter 353. It then switches "on," and the NOR gate 354 switches "off." This removes the holding potential applied through the circuit 349 to the point Y5. The called line path 96 (FIG. 12) through the matrix 50 now drops out.

*Transfer.*—Once a call is established through the transfer junctor, two subscribers may converse in a conference call. When the first calling party is finished with his part of the conversation, he simply hangs up. This makes the point 319 move to a voltage which turns "off" the 3-volt detector 300, and turns "on" the inverter 301. When the signal from the inverter 301 appears, the release delay circuit 302 begins to measure a period of time. There is a period which is longer than a standard dial pulse. Then the output of the circuit 302 turns "on"; the NOR gate 335 turns "off"; the OR gate 370 conducts. This energizes the lower-most input of AND gate 371. The output of the circuit 302 also starts the release delay circuit 303 which also measures a period of time. The transfer occurs during the period after the output of circuit 302 appears and before the output of the circuit 303 appear. During this period, the upper input of NOR gate 372 is de-energized. When it fired, the diode 326 turned "on" detector 328, and turn "off" inverter 334 to de-energize the middle input of the NOR gate 372. When the time frame occurs, conductor ST2 is de-energized, and NOR gate 372 conducts.

There is now a coincidence at gate 371 which conducts to switch the transfer flip-flop 306 to its "1" side. During the time slot while conductor ST2 is de-energized, the gate 373 conducts. This sends a signal to the city trunk circuit 85 via the circuits 323, 324, 325, 321, 94, 326, and 92. During this same time slot, an "off" pulse is returned from the trunk circuit over points 331, 319. This pulse turns "on" the detector 300 and turns "off" the inverter 301. The release delay circuit 302 turns "off" quickly. The output from circuit 302 appears at the upper input of an AND gate 375 where there is a coincidence with the output of the gate 373. This feeds a signal into the "1" side of the drop path flip-flop 310. When it switches "off" its "0" side, the AND gate 348 turns "off" to remove the end-marking at the point Y5. This drops the path 96 through the network 50.

*Conference call and release.*—During the transfer conditions using the junctor 93, subscribers may be connected together in a conference call. If there is such a conference call, one or more of the subscribers may wish to withdraw from the conference without disturbing the remaining connections.

To complete this function, the connections are extended in a manner such that the withdrawing subscriber breaks the circuit to point Y5. A result is that the detector 360 terminates the coincidence at the input of the AND gate 364. There is a delay while the circuit 365 times out. Then the inverter 353 turns "on." This turns "off" the NOR gate 354 and terminates the holding current to the network.

Also responsive to the termination of a signal from the detector 360, the AND gate 361 turns "off." When the output of gate 361 disappears, an inverter 380 turns on to energize an input of AND gate 381. The terminate flip-flop 307 was switched to its "1" side when the 14-volt detector 346 conducted under control of the register. The inverter 383 switched "on" when the release delay circuit 302 switched "off" at the start of the call. The master memory flip-flop 308 stands on its "0" side. Thus, the AND gate 381 conducts. The output of gate 381 feeds through OR gate 370 to AND gate 371. When the time slot occurs, the AND gate 371 conducts to set the transfer flip-flop 306 to its "1" side.

The next time slot causes a coincidence in gate 373 which conducts. A result is the transmission of a signal through circuits 323, 324, 325, 321, 94, 326, 92 to the city trunk circuit 85. It responds by releasing the path comprising the PNPN diodes 326, 332. This causes the transfer junctor 93 to return to normal.

One final point which is worth noting at this time is that economy and reliability are enhanced. The allotters 62–64 are nothing more than ring counters—which are extremely reliable and inexpensive devices. The allotters step at an extremely low rate of speed relative to the electronic switching speeds. For example, each junctor is enabled for one-six hundredth of a second (if generator 65 (FIG. 1) operates at the assumed speed of 600 cycles per second). At this speed the dropping and reconnecting of paths occur so quickly that the conversing subscribers are not aware of any interruptions in their conversation. Moreover, the dropping and reconnecting occurs so quickly relative to the enable period that the entire system literally stands still while one function occurs. This means that the control functions may be completed via simple equipment responsive to markings applied to common busses. During the time while junctor 54, for example, is allotted, no other equipment in the exchange may gain access to the bussess 111, 112, 113. Thus, there is no need for providing complicated gate circuits on the two ends of these busses. Thus, it should be apparent that the drop path system greatly increases both the economy and reliability of the system.

While the principles of the invention have been described above in connection with specific apparatus and applications, it is to be understood that this description is made only by way of example and not as a limitation on the scope of the invention.

We claim:

1. An electronic switching telephone system comprising an end-marked, current controlled, self-seeking network having lines connected to one side and a first plurality of switch path control equipments connected to the other side, said first plurality of control equipment being relatively simple circuits having means for completing and holding primary talking paths through said network, a pool of other common control equipments accessible to said first plurality of equipments via separate switching matrices, means in each of said common control equipments for controlling the operations of said first plurality of equipments during performance of a particular function, and means responsive to various call conditions encountered in said first plurality of equipments for extending secondary control connections through said separate switching matrices to seize an individual one of said other equipments in said common pool for supervising the operation of said first plurality of equipments during the performance of functions required to serve the particular one of said various conditions which caused said secondary connection to be extended.

2. The electronic switching telephone system of claim 1 and a plurality of allotters, each of said allotters providing a sequence of time periods for individually enabling each of said first plurality of equipments to seize control over an idle equipment in said pool of other common control equipments.

3. The electronic switching telephone system of claim 1 and means for giving each of said first plurality of control equipments access to both said network and said common pool of other equipments on a time-shared basis.

4. The electronic switching telephone system of claim 1 and a plurality of common signal busses extending from said lines to at least some of said other control equipments, said lines being selectively coupled to said busses in accordance with the particular ones of several different types of services which are given to specific ones of said lines, means in said other control equipments responsive to conditions which are indicating a need for any one of said services for dropping a path through said network whereby the voltage changes at the ends of said path, means associated with said lines and responsive to the dropping of said path for applying said voltage changes over said selective coupling to corresponding ones of said busses, and means in said other control equipments for giving a specific service to a specific line only if said voltage change appears on said busses in a manner which indicates that said specific line is entitled to receive said specific service.

5. The electronic switching telephone system of claim 4 wherein said paths are dropped during a time period which identifies a specific call requesting said service, and means in the one of said pool of other common equipments designed for controlling the giving of said requested service for reseizing via said network the line engaged in the specific call identified by said time period.

6. The electronic switching system of claim 4 and means responsive to the voltage changes applied to said busses for identifying the directory number of a subscriber line applying said voltage, toll ticketing equipment, and means for forwarding the identity of said number to said toll ticketing equipment.

7. An electronic switching telephone system comprising an end-marked, current controlled, self-seeking network having lines connected to one side and a first plurality of switch path control equipments connected to the other side, means comprising some of said first plurality of control equipments for completing local connections, means comprising other of said first plurality of control equipments for transferring completed connections, means comprising still other of said first plurality of control equipments for giving special feature services, a plurality of common registers accessible to said first plurality of control equipments, means in each of said registers for controlling the operation of said first plurality of control equipments responsive to subscriber transmitted digital information, means responsive to a call originate condition for extending a primary talking connection through said network to seize an idle one of said first plurality of control circuits for completing local connections, a separate switching matrix, means in the seized one of said first plurality of control equipments for extending a connection through said separate switching matrix to seize an idle one of said common registers for supervising the completion of an individual connection through said network to the particular one of said lines which is identified by said digital information, and means in the seized one of said first plurality of control equipment responsive to the completion of said individual connection for releasing said register and thereafter holding said primary connection for the duration of said call.

8. The electronic switching telephone system of claim 7 and at least two allotters for providing a succession of time periods, means responsive to the time periods of one of said allotters for enabling at least some of said first plurality of control equipments to seize control over any idle one of said registers, and means responsive to the time periods of another of said allotters for enabling other of said first plurality of control equipments to perform certain call functions.

9. The electronic switching telephone system of claim 7 and a plurality of common signal busses extending from said lines to said control equipments, each of said lines being selectively coupled to said busses in accordance with the particular ones of many different types of services which are given to the coupled line, means responsive to conditions on a line requiring one of said services for dropping said primary connection through said network to said line whereby the voltage rises at the ends of said dropped connection, means associated with said dropped line and responsive to the dropping of said connection for applying said rising voltage over said coupled ones to corresponding ones of said busses, and means in said control equipments for giving a specific service to said dropped line only if said rising voltage appears on said busses in a manner which indicates that said dropped line is entitled to receive said one service.

10. The electronic switching telephone system of claim 9 wherein said primary connections are dropped during a time period which identifies a specific call that requires one type of service, and means associated with said control equipments for giving the said specific service for reseizing the line requiring service during said time period.

11. An electronic switching telephone system comprising an end-marked current controlled, self-seeking network having lines connected to one side and a first plurality of control equipment connected to the other side, at least one of said first plurality of control equipments comprising a bistable master memory means and at least one other bistable means for storing an indication and controlling a particular function, means responsive to successive circuit operations for switching said master memory means back and forth between two stable states as each of said successive operations occur, means responsive to said particular function for switching said other bistable means from one to another stable state, and means jointly responsive to the simultaneous conditions of said two bistable means for providing a sequence of controls in said one control equipment.

12. The electronic switching telephone system of claim 11 and a separate switching matrix, a pool of common registers accessible to said first plurality of equipments via said separate matrix, means in each of said common registers for controlling said first plurality of control equipments, and means responsive to various call condition controls extended from said register to said one control equipment for causing said switching of said master memory means.

13. The electronic switching telephone system of claim 11 and means for providing time periods for enabling said first plurality of control equipments to perform at least some of said successive operations, and means controlled by the conditions of said bistable means and responsive to said time periods for performing selected ones of said operations.

14. The electronic switching telephone system of claim 11 and a plurality of common signal busses extending from said lines to said first plurality of control equipments, said lines being selectively coupled to said busses in accordance with the various types of services given to the specific lines, means responsive to conditions requiring special control functions for dropping a path through said network whereby the voltage changes at the ends of said path, means responsive to the dropping of said parts for applying the resulting voltage changes over said couplings to the corresponding ones of said busses, and means in said control equipments for giving a specific service to a specific line only if said voltage change appears on said busses to indicate that said line is given said specific service.

15. An electronic switching telephone system comprising a switching network having lines connected to one side and junctors connected to the other side, a source of time control periods for sequentially enabling said junctors to seize exclusive control over said network, a plurality of common register circuits, means for extending a path through said network between a calling line and an idle one of said junctors during a time period which identifies the seized junctor, a junctor-register switching matrix for selectively connecting any of said junctors to any of said registers, means responsive to said extension of said path through said network to said seized junctor for causing said seized junctor to in turn seize an idle one of said registers via said junctor-register matrix, means in said seized register responsive to subscriber transmitted data for causing a path to be extended through said network between a called line and said seized junctor during a time period which identifies said seized junctor, and means for thereafter releasing said register while causing said seized junctor to hold said path.

16. The electronic switching telephone system of claim 15 and means in said register responsive to a detection of certain of said data for causing said seized junctor to attempt to seize another circuit, said junctor making said attempt by dropping said path between one of said lines and said seized junctor whereby the voltage changes at the ends of said dropped path, a plurality of common signal busses extending from said lines to control equipments including said junctors, registers and other circuits, said lines being selectively coupled to said signal busses in accordance with the types of services given to the coupled lines, means for applying said voltage change which occurs upon its dropping of said parts from said one line over said couplings to those of said busses which are coupled thereto, and means in said other circuits for giving the specific service identified by said certain data to said one line only if said voltage changes appear on busses which indicate that said one line is entitled to receive the specific service.

17. The electronic switching telephone system of claim 16 wherein said other circuit comprises a trunk circuit, a transfer junctor, a trunk transfer matrix, means responsive to other subscriber transmitted data for causing said trunk circuit to seize said transfer junctor via said trunk transfer matrix if trunk service to said one line is not restricted by said voltage change markings applied to said signal busses, and means in said transfer junctor for extending a pre-existing call connection to a different subscriber line.

18. The electronic switching telephone system of claim 17 wherein said transfer junctor comprises a bistable master memory means and at least one other bistable means for controlling a special circuit operation, means responsive to successive steps of circuit operations for switching said master memory means back and forth between two stable states, means responsive to specific circuit functions for switching said other bistable means from one state to another state, and means jointly responsive to the simultaneous conditions of said bistable means for providing a sequence of steps of circuit operations in said junctor circuit.

19. The electronic switching telephone system of claim 16 wherein said other circuit comprises a line identification circuit, a plurality of number identification busses, extending from said lines to said line identification circuit, means associated with each of said lines for simultaneously sending a request for line identification over said signal busses and sending a selective marking over said identification busses, means in said line identification circuit for reading said selective marking responsive to the receipt of said request marking on said signal highway, and toll ticketing means for making an accounting record for charging a particular line responsive to said reading.

20. An electronic switching telephone system comprising a plurality of equipments and a switching network for extending connections between said equipments, a plurality of common signal busses extending between said equipments, certain of said equipments being selectively coupled to said busses in accordance with the types of services given to the individual ones of the certain equipments, means responsive to conditions requiring any of said services for dropping a path through said network whereby the voltage changes at the ends of said path, means in the one of said certain equipments that was associated with said dropped path for applying the voltage change which occurs when said path drops over said coupling to those of said busses which are coupled to the equipment applying said voltage changes, and means in other of said equipments for giving a specific one of said services to the equipment applying said voltage changes only if said voltage change appears on said busses in a manner which indicates that said voltage applying equipment is entitled to receive said specific service.

21. The electronic switching telephone system of claim 20 and a source of time frames for enabling each of said equipments to seize exclusive control over said network for the duration of a corresponding one of said time frame, said time frames being individually associated with switch paths through said network, means for dropping said paths during a time frame which identifies the dropped switch path, and means responsive to signals on said busses for reseizing the dropped equipment over another switch path through said network during said time frame.

22. A junctor circuit for controlling telephone connections from a first subscriber line to a second subscriber line, said junctor comprising a bistable master memory means, and at least one special circuit function control bistable means, means responsive to successive steps of circuit operations for switching said master memory means back and forth between two stable states, means responsive to an occurrence of said special circuit function for switching said special function bistable means tor from said junctor to a control circuit, means responsive sponsive to the simultaneous conditions of said bistable means for providing a sequence of controls in said junior circuit.

23. The junctor circuit of claim 23 and a signal conductor from said junctor to a control circuit, means responsive to an extension of a connection to said junctor circuit for extending a signal over said signal conductor to said control circuit means, and means responsive to signals returned from said control circuit over said signal conductor for storing an indication in said bistable means.

No references cited.

KATHLEEN H. CLAFFY, *Primary Examiner.*

WILLIAM C. COOPER, *Examiner.*